Feb. 17, 1948.  C. C. S. LE CLAIR  2,436,147

PRESSURE RESPONSIVE VALVE

Original Filed Sept. 30, 1942

Inventor
Camille Clare Sprankling Le Clair
By Williams, Bradbury & Hinkle
Attorneys Patented Feb. 17, 1948

2,436,147

UNITED STATES PATENT OFFICE 2,436,147

PRESSURE RESPONSIVE VALVE

Camille Clare Sprankling Le Clair, Acton, London, England

Original application September 30, 1942, Serial No. 460,320, now Patent No. 2,374,822, dated May 1, 1945. Divided and this application August 23, 1944, Serial No. 550,772. In Great Britain August 22, 1941

4 Claims. (Cl. 137—153)

This invention relates generally to means for preventing the aeration of liquid in liquid circulating systems, and, in particular, to a novel valve for use in such systems. This application is a division of my copending application Serial No. 460,320, filed September 30, 1942, now Patent No. 2,374,822, granted May 1, 1945, for an invention entitled "Means for preventing the aeration of liquid in liquid circulating systems."

On aircraft and other engines, the oil is frequently withdrawn from the engine sump by a scavenge pump which forces the oil into an oil tank from which it is supplied to the engine by a pressure pump. The scavenge pump usually has a capacity which is greater than that of the pressure pump in order to ensure that the quantity of oil in the sump does not become excessive. Consequently, a mixture of oil and air enters the scavenge pump and is delivered by the pressure pump to the engine. This is particularly disadvantageous in the case of an aircraft engine, because air entrained in the lubricating oil of an aircraft engine causes various difficulties particularly when the aircraft is flying at high altitudes.

An important object of the invention of my said co-pending application is to prevent the flow of air to the scavenge pump used in oil circulating systems of aircraft and, to this end, in a liquid circulating system comprising a liquid container and a pump for withdrawing liquid from the container, means are provided for preventing aeration of the liquid circulated by said pump, which comprises a level detecting means, a liquid supply source, means for controlling the flow of liquid from the said source to the pump such that when the said level detecting means indicates a low level in the container, the flow from the said source is permitted and when the said level detecting means indicates a high level in the container the flow from said source is restricted or stopped, and means for restricting the flow of liquid from the container to the pump when the pump is receiving liquid from the said source, the arrangement being such that the liquid in the container is always maintained at such a level therein that the pump cannot withdraw air therefrom. As described in the said specification, the said level detecting means takes the form of means for withdrawing air from the container when the liquid therein falls below a predetermined level, the flow of liquid to the pump from the container then being restricted and the pump receiving liquid from the aforesaid liquid supply source, the said means also withdrawing liquid from the container when the liquid in the latter rises above the said level and the pressure of the liquid thus withdrawn acting to operate a control device in order to cut off the flow of liquid from the said liquid supply source to the pump, which latter then withdraws liquid from the container, the arrangement being such that the pump is at all times prevented from withdrawing air from the container.

One object of the present invention is to provide in a liquid circulating system which includes the combination of a liquid container, a source of liquid, a pump adapted to withdraw liquid from said container and deliver it to the said source and means for preventing aeration of the liquid circulated from said container to said source, a control valve comprising a cylinder having a pressure end and a neutral end, a valve body disposed in said cylinder, means biasing said valve body to said pressure end, a piston formed on said valve body at said pressure end and a valve member formed on said member at said neutral end, an intake port at said pressure end, an outlet port at said pressure end having a restricted orifice, and intake and outlet ports at said neutral end adapted to be closed by said valve member when pressure is developed in said pressure end of said cylinder.

A further object of this invention is to provide in a liquid circulating system having a liquid container, a source of liquid, and a pump adapted to withdraw liquid from said liquid container and deliver it to said source of liquid, a control valve comprising a cylinder having a pressure end and a neutral end, a port in said neutral end connected to said liquid source, a second port in said neutral end connected to the intake of said pump, a valve body in said cylinder having a valve member disposed in said neutral end and a piston member disposed in said pressure end, and means biasing said valve body toward said pressure end, a constantly open inlet port in said pressure end connected to means for withdrawing liquid from said container and delivering it under pressure to said pressure end, an outlet from said pressure end, and a restricting orifice in said outlet, whereby the creation of a predetermined liquid pressure in said pressure end actuates said valve member to close said ports in said neutral end and shut off the connection between said source and said pump, the pump then withdrawing liquid only from said container.

A still further object of this invention is to provide a control valve comprising a cylinder having a pressure end and a neutral end, a valve body disposed in said cylinder and having a piston at said pressure end and a valve member at said neutral end, inlet and outlet ports at said neutral end adapted to be covered by said valve member, a conduit extending through said valve body connecting said pressure end and said neutral end, a liquid flow restricting orifice in said conduit, a port in said pressure end, a constantly open port in said neutral end, and means biasing said valve body toward said pressure end.

The constructional embodiments of the invention described hereinafter are applied to an aircraft engine oil circulating system wherein oil is transferred by a scavenge pump from the engine sump to a tank, the level detecting means comprises a small auxiliary or pilot pump which is operated in parallel with the scavenge pump. A small suction pipe, leading from a level within the sump above the level of the entrance to the scavenge suction pipe, communicates with the inlet to the pilot pump. A discharge pipe provides communication between the outlet of the pilot pump and one end, hereinafter called "the pressure end" of a control valve cylinder in which a piston valve is slidably arranged, and a return pipe, in which is fitted a flow-restricting orifice, provides communication between the pressure end of the control valve cylinder and the sump. Near the end of the piston valve remote from the pressure end of the cylinder the valve is formed with an annular recess. The piston valve is biased by a spring towards the pressure end of the cylinder and against a shoulder therein, and when the valve is in this position the said annular recess communicates with an inlet port and an outlet port formed in the wall of the cylinder. These ports are both closed by the piston valve when it is moved towards the opposite end of the cylinder, hereinafter called "the neutral end," in the manner hereinafter described. The said outlet port communicates with the inlet of the scavenge pump and the said inlet port communicates with a balance feed pipe leading from the said tank. In the scavenge pump suction pipe is provided a bias valve which is springloaded to offer a resistance to the flow of oil therethrough sufficient to ensure that the flow of oil through the balance feed pipe will satisfy the requirements of the scavenge pump when required. A small pipe provides communication between the neutral end of the said control valve cylinder and the sump thus permitting the necessary displacement of oil to and from this end of the cylinder during movements of the piston valve.

Generally, the supply of oil to the sump from the engine is less than the capacity of the scavenge pump, so that there is a tendency for the level to fall. Assuming, that it has fallen to some point below the entrance of the pilot pump suction pipe but is still above the entrance to the scavenge pump suction pipe, then the said auxiliary pump can only circulate air. The oilflow restricting orifice in the pilot pump return pipe will, as previously explained, offer very little resistance to the flow of air, so that the pressure on the pressure end of the piston valve will be insufficient to move it against its spring. Thus, a free passage from the inlet port to the outlet port is provided in the cylinder and oil from the oil tank will, therefore, be free to flow through the balance feed pipe to the scavenge pump while the flow of oil to the scavenge pump from the sump will be restricted by the bias valve. In these circumstances, the flow of oil to the sump from the engine will exceed the flow from the sump to the scavenge pump so that the level of oil in the sump will commence to rise. As soon as the entrance to the pilot pump suction pipe is submerged, however, the pilot pump will commence to circulate oil which, owing to the resistance to flow by the flow-resisting orifice, will exert pressure on the pressure end of the piston valve causing it to be displaced towards the neutral end of the valve cylinder and to interrupt the flow of oil from the tank to the scavenge pump through the balance feed pipe. The scavenge pump will then be wholly fed from the sump and since its capacity is greater than the supply from the engine the level will commence to fall. Thus, when the level of the oil in the sump is below the entrance to the pilot pump suction pipe it begins to rise and when the level is above the said entrance it begins to fall. Thus, the level is maintained approximately at the height of the pilot pump suction pipe entrance, it never falls to the level of the scavenge pump suction pipe entrance and thus prevents the flow of air through the scavenge pump suction pipe.

Two constructional forms of the invention, both applied to the oil circulating system of an aircraft engine, are shown by way of example on the accompanying drawings, whereon:

Figure 1:
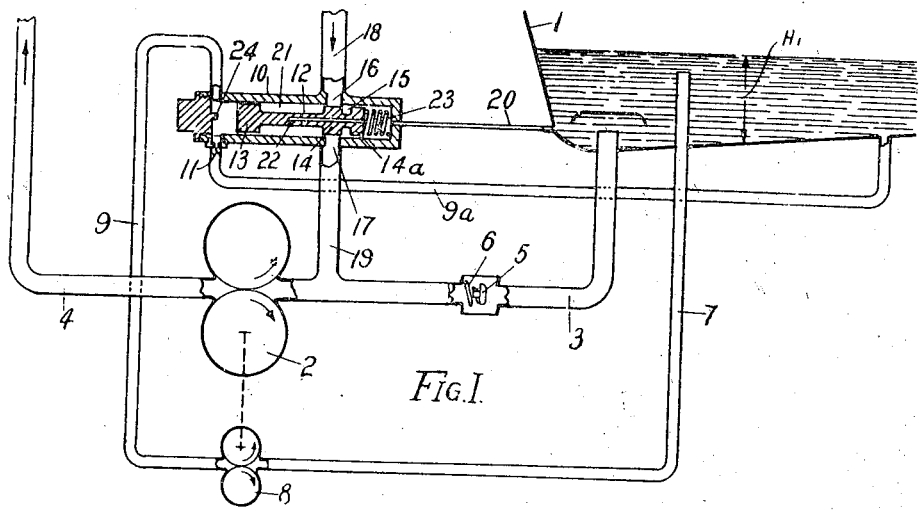
Fig. 1 is a diagrammatic view of one construction, in which the pilot pump is withdrawing oil from the sump and oil is being supplied to the scavenge pump from the sump.
Figure 2:
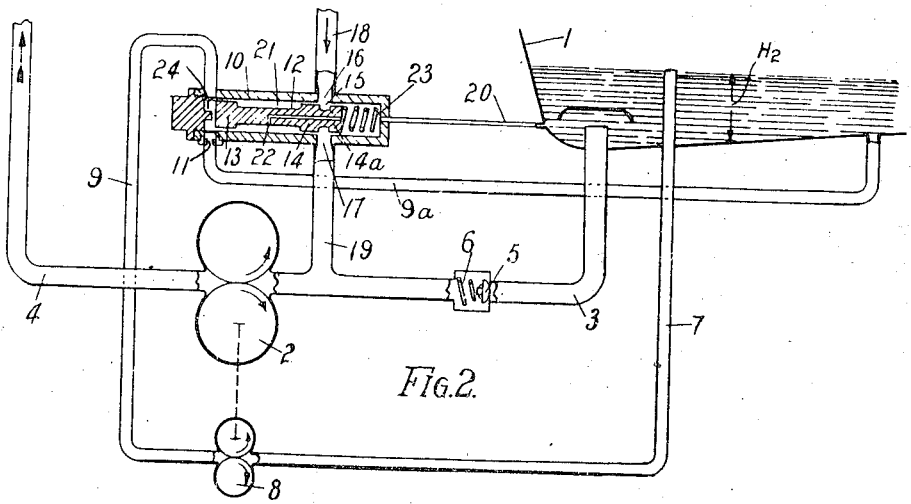
Fig. 2 is a diagrammatic view corresponding to Fig. 1, but showing the pilot pump withdrawing air from the sump and the scavenge pump receiving oil from the oil tank, the supply of oil to the scavenge pump from the sump when being restricted.

Referring first to Figs. 1 and 2:

Oil is transferred from the engine oil sump 1 to an oil scavenge pump 2 through a suction pipe 3, the discharge side of the pump being connected by a discharge pipe 4 to an oil storage tank (which is not shown in the drawings) from which it is returned to the engine by a pressure pump (also not shown). In the suction pipe 3 there is a bias valve 5, which is pressed towards its seat by a spring 6. A smaller suction pipe 7 projects into the engine sump at one end and is connected at its opposite end to the suction side of a small auxiliary or pilot pump 8 the discharge side of which is connected by a discharge pipe 9 to the pressure end of a cylinder 10. It will be noted that the end of the pipe 7 is arranged at a higher level in the sump than the end of the pipe 3. A return pipe 9A connects the pressure end of the cylinder 10 to the engine sump and in this pipe a flow-restricting orifice 11, calibrated to suit requirements, is provided.

A piston valve 12 is slidably arranged in the cylinder 10 and is formed with a piston part 13 slidable in the pressure end of the cylinder and valve parts 14, and 14a which are slidable in the neutral end of the cylinder. Between these parts is an annular recess 15. The valve part 14 serves to control the flow of oil from the tank to the scavenge pump feed pipe as will be seen later, while the valve part 14a prevents communication between the oil tank and the sump through a bleed-off pipe referred to hereinafter. Diametrically opposed inlet and outlet ports 16 and 17 are formed in the wall of the neutral end of the cylinder, the said ports being respectively connected to the said oil tank and to the scavenge pump suction pipe 3 by the balance feed pipes 18 and 19. A small leakage bleed-off pipe 20 connects the neutral end of the valve cylinder to the engine sump, and permits the necessary displacement of oil to and from the neutral end of the cylinder 10 during movements of the valve 12. That part of the valve 12 between the piston part 13 and the valve part 14 may be recessed to form an annular clearance space 21 and this clearance space may be connected to the neutral end by a port 22 and thence by the pipe 20 back to the sump.

By this means, any leakage that may take place from the pressure end past the piston 13 is carried back to the sump instead of being permitted to find its way past the valve part 14 to the port 17 and thence to the scavenge pump, where if the leakage consisted of air, it might cause aeration.

A spring 23 acts to force the piston valve into the position shown in Fig. 2, in which the recess 15 registers with the inlet and outlet ports 16 and 17 and communication is made via the balance feed pipes 18 and 19 from the oil tank to the scavenge pump suction pipe 3.

The travel of the valve 12 due to the expansion of the spring 23 is limited by contact of the valve with a stop 24.

The loading of the spring 6 acting upon the bias valve 5 is such that the valve will offer a resistance to the flow of oil through the pipe 3 sufficient to ensure that the flow of oil through the balance feed pipes 18 and 19 will satisfy the requirements of the scavenge pump when necessary. The pipe 20 permits the necessary displacement of oil to and from the neutral end of the cylinder 10 during movements of the piston valve.

The supply of oil to the sump from the engine is generally less than the capacity of the scavenge pump, hence the tendency of the oil level in the sump is to fall.

Assuming that the level has in this manner fallen low enough to expose the end of the pilot pump suction pipe 7 as shown at $H_2$ in Fig. 2, the pilot pump will then draw only air which will be delivered via the discharge pipe 9 and the pressure end of the control valve cylinder 10 to the restricting orifice 11. This orifice offers only very slight resistance to the flow of air delivered by the pilot pump, so that the pressure built up in the pressure end of the cylinder 10 will be insufficient to overcome the force of the spring 23.

The valve will accordingly remain in the open position shown in Fig. 2, maintaining free passage for the oil from the tank through the balance feed pipes 18 and 19 and the recess 15 to the suction side of the scavenge pump, flow of oil from the sump being restricted or stopped by the bias valve 5.

In these circumstances, the flow of oil from the engine to the sump will exceed the withdrawal of oil from the sump by the scavenge pump 2, and thus the level of the oil in the sump will commence to rise, until it covers the end of the pilot pump suction pipe 7, as shown at $H_1$, Fig. 1. Thereupon, the pilot pump commences to circulate oil and, because the flow-restriction orifice 11 resists the flow of oil far more than the flow of air, the pressure in the pressure end of the cylinder 10 builds up and, in due course, forces the piston valve into the position shown in Fig. 1 against the opposing action of the spring 23. In this position of the valve, the inlet and outlet ports 16 and 17 are masked by the valve part 14 and oil cannot flow from the oil tank into the scavenge pump suction pipe 3. The suction of the scavenge pump 2 then causes the bias valve 5 to open again against the action of its spring 6 and oil is again circulated by the scavenge pump from the sump through the pipe 4 into the oil tank. Under these conditions, the demand of the scavenge pump being greater than the supply, the oil level in the sump will again commence to fall and will continue to do so until it again falls to the top of the pilot pump suction pipe 7, whereupon the pilot pump again commences to circulate air and the sequence of operations, as described above, is repeated. Thus, whenever the oil in the sump is below the end of the pipe 7, the oil level begins to rise and when the oil is above the said end, the oil level begins to fall, so that the oil level is maintained approximately at the level of the end of the pipe 7 within the sump and effectively prevents the flow of air through the scavenge pump feed pipe 3.

Figure 3:
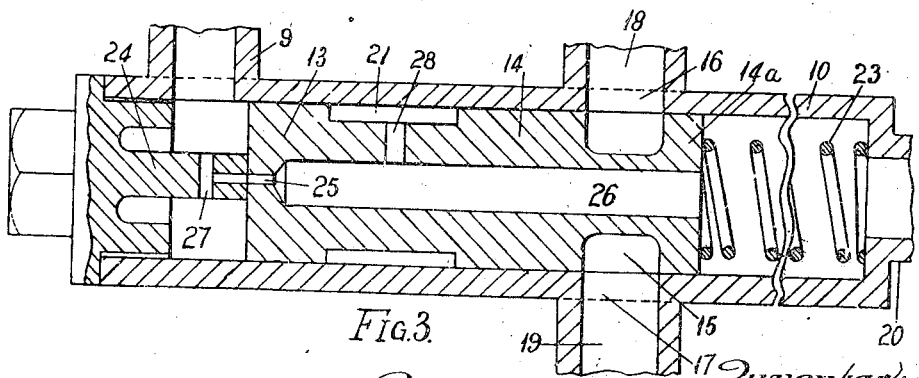
Fig. 3 is a sectional view, to a larger scale, of an alternative construction of the piston control valve.

A modified construction of the piston control valve is shown in Fig. 3. In this construction, the pilot pump discharge pipe 9 communicates with the pressure end of the cylinder 10, as before but the return pipe 9a with its flow restricting orifice is deleted, the orifice being arranged in the valve 12 itself. As drawn, it is shown at 25 in the pressure end of the valve and the passage 26 behind it is opened out to a relatively large diameter to provide free flow to the neutral end for any air or oil that passes.

In this construction, the leakage bleed-off pipe 20 needs to be somewhat larger in diameter as it has not only to conduct leakage but also the orifice discharge back to the sump. Further, the stop 24 must be arranged so that it does not blank off the orifice 25; for instance, it may be provided with an internal port 27 or it may be placed eccentrically.

The clearance space 21 may be connected to the neutral end by a small passage 28 opening into the passage 26.

Otherwise the construction of the valve is substantially as previously described.

In this modified construction, when the level of the oil in the sump falls below the top of the pilot pump suction pipe 7, and air is circulated by the pilot pump through the discharge pipe 9 into the pressure end of the cylinder 10 it passes via the flow restriction orifice 25, the bore 26, the neutral end of the cylinder and the leakage bleed pipe 20 into the sump. Under these conditions, the piston valve remains in the position shown in Fig. 3 and oil can flow into the scavenge pump suction pipe through the balance feed pipe 18, 19. On the other hand, when the level of the oil in the sump rises above the end of the pilot pump suction pipe 7, the pilot pump commences to pump oil and because the flow of the oil from the cylinder is resisted by the flow-restriction orifice 25 the piston valve is forced to the right against the action of the spring 23. The flow of oil from the oil tank to the scavenge feed pipe is then cut off by the masking of the ports 16 and 17 by the piston valve part 14. When the level of the oil in the sump again falls below the end of the pilot pump suction pipe 7, the pilot pump again commences to pump air and the piston valve is returned to the position shown in Fig. 3 by the action of the spring 23.

Various modifications can, of course, be introduced without departing from the scope of the invention.

It will be understood that the said level detecting device can be in any convenient form such as an oil operated injector fed from either the scavenge pump or the oil pressure pump.

Further, in order to prevent the excessively high pressures that may be generated by the increased viscosity of the oil when starting up from cold, it may be necessary to provide relief additional to the flow-restricting orifice aforesaid.

This relief can be accomplished by the introduction of some form of spring-loaded relief valve, placed in parallel with the flow-restricting orifice. It may be formed in conjunction with the flow-restricting orifice, the plate in which the orifice is cut being used as a disc valve, or it may, by the provision of a suitable port or ports be formed in conjunction with the control valve itself or again a separate valve may be provided.

I claim:

1. A control valve for a liquid circulating system having means for preventing the aeration of liquid circulated in said system, comprising in combination a cylinder having a pressure end and a neutral end, a valve body disposed in said cylinder and having a piston at said pressure end and a valve part at said neutral end, inlet and outlet ports at said neutral end adapted to be covered by said valve part, a recess formed between said piston and said valve part, a liquid outlet from said neutral end, and a port in said valve body connecting said recess with said neutral end and adapted to return liquid collected in said recess to said neutral end for the discharge therefrom through said outlet.

2. A control valve for a liquid circulating system having means for preventing the aeration of liquid circulated in said system, comprising in combination a cylinder having a pressure end and a neutral end, a valve body slidably disposed in said cylinder and having a piston at said pressure end and a valve part at said neutral end, inlet and outlet ports at said neutral end adapted simultaneously to be covered by said valve part, a recess formed in said valve body between said piston and said valve part, a liquid outlet from said neutral end, a port in said valve body connecting said recess with said neutral end and adapted to return liquid collected in said recess to said neutral end for discharge therefrom through said liquid outlet, and means biasing said valve body toward said pressure end.

3. A control valve for a liquid circulating system, comprising in combination a cylinder having a pressure end and a neutral end, a valve body disposed in said cylinder and having a piston at said pressure end and a valve part at said neutral end, inlet and outlet ports at said neutral end adapted to be covered by said valve part, a passageway extending through said valve body connecting said pressure end and said neutral end, a liquid flow restricting orifice in said passageway adapted to cause pressure to be built up in said pressure end, an inlet port in said pressure end, a constantly open liquid outlet in said neutral end, and means biasing said valve body toward said pressure end.

4. The control valve claimed in claim 3, wherein a stop in said pressure end limits movement of said valve body towards said pressure end, said stop being formed with a passageway which is in constant communication with said inlet port in said pressure end and with said restricting orifice in said passageway through said valve body.

CAMILLE CLARE SPRANKLING LE CLAIR.

REFERENCES CITED

The following references are of record in the file of this patent:

UNITED STATES PATENTS

| Number | Name | Date |
|---|---|---|
| 1,156,165 | McManamy | Oct. 12, 1915 |
| 1,455,832 | Church | May 22, 1923 |
| 1,479,307 | McAneny | Jan. 1, 1924 |
| 2,121,324 | Manley | June 21, 1938 |

FOREIGN PATENTS

| Number | Country | Date |
|---|---|---|
| 552,255 | Great Britain | Mar. 30, 1943 |
| 637,742 | Germany | 1936 |
| 712,112 | France | 1931 |